Nov. 20, 1962     H. A. FRY     3,064,503
TOOL ATTACHMENT FOR BORING BARS
Filed Feb. 18, 1959
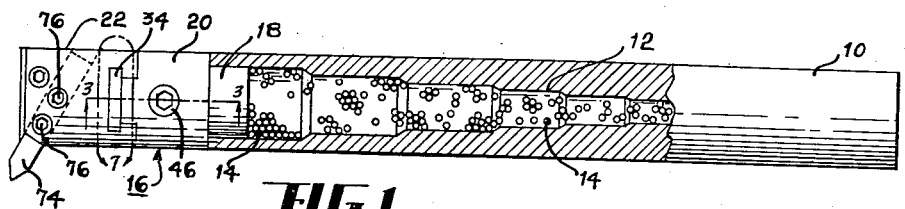
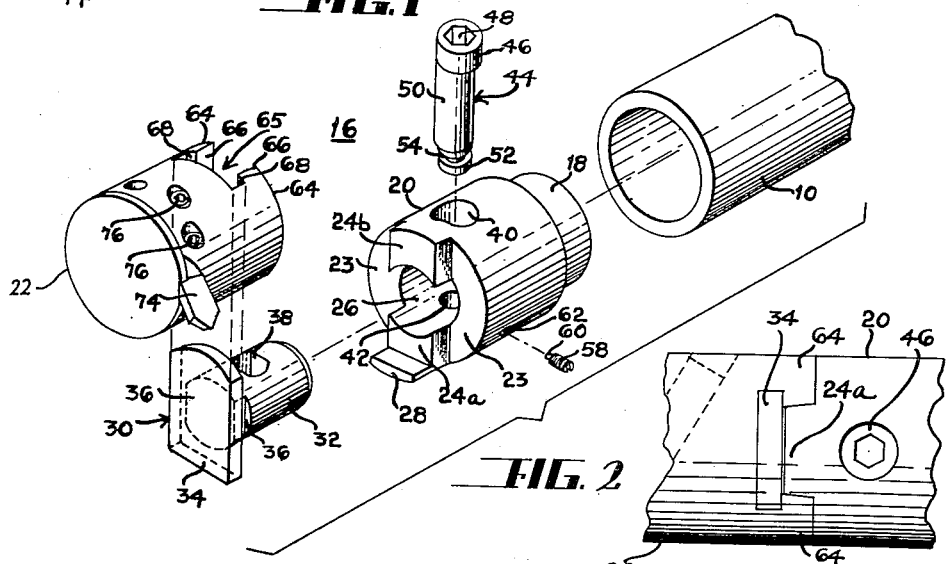
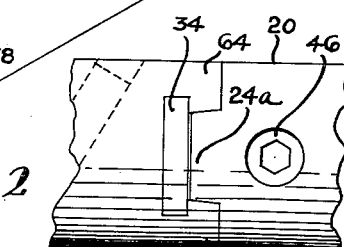
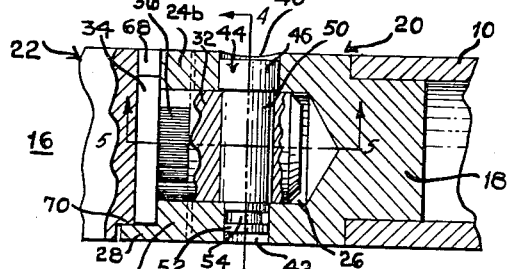
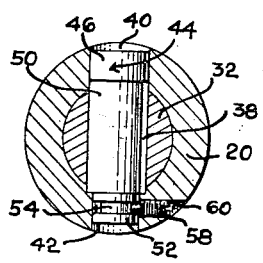
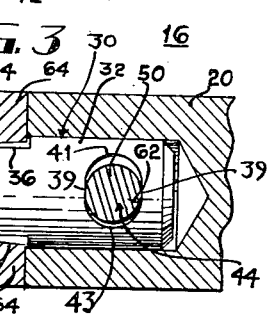
INVENTOR.
HUGH A. FRY
BY
HIS ATTORNEYS

United States Patent Office 3,064,503
Patented Nov. 20, 1962

3,064,503
TOOL ATTACHMENT FOR BORING BARS
Hugh A. Fry, R.R. 2, Eaton, Ohio
Filed Feb. 18, 1959, Ser. No. 794,034
7 Claims. (Cl. 77—58)

This invention relates to a tool holding attachment for boring bars and more particularly to an attachment having interchangeable parts such that a number of different types of cutting tools may be interchangeably attached to a single boring bar. However, the invention is not necessarily so limited. The present application is a continuation-in-part of my copending application Serial No. 722,875, filed March 21, 1958, and entitled Tool Attachment for Boring Bars, now abandoned.

One object of this invention is to provide a tool holding attachment for boring bars, which attachment includes one or more interchangeable cutting tool holders such that a given boring bar can be outfitted with a number of different types of tool holders and therefore a number of different types of cutting tools.

Another object of this invention is to provide, in a tool holding attachment for a boring bar, a support member adapted to be fixedly attached to the boring bar and adapted to interchangeably receive complementary tool holding members, said support member being designed to precisely align the tool holding member engaged therewith with respect to the boring bar.

A further object of this invention is to provide, in a tool holding attachment for a boring bar, a support member adapted to be fixedly attached to the boring bar and adapted to interchangeably receive complementary tool holding members, and clamping means associated with the support member for drawing a tool holding member into firm attachment with the support member in precise alignment with the boring bar.

Other objects and advantages reside in the construction of parts, the combination thereof, the method of manufacture and the mode of operation, as will become more apparent from the following description.

In the drawings,

FIGURE 1 is a plan view of the tool attachment of this invention in association with an improved chatter resistant boring bar, portions of the boring bar being illustrated in sectional detail to expose the construction thereof.

FIGURE 2 is an exploded perspective view of the tool attachment of this invention.

FIGURE 3 is an enlarged sectional view taken substantially along the line 3—3 of FIGURE 1.

FIGURE 4 is a sectional view taken substantially along the line 4—4 of FIGURE 3.

FIGURE 5 is a fragmentary sectional view taken substantially along the line 5—5 of FIGURE 3, this figure illustrating an intermediate position of the draw bar associated with the tool holding attachment of this invention.

FIGURE 6 is a sectional view analogous to FIGURE 5 illustrating a clamping position for the draw bar.

FIGURE 7 is an enlarged plan view of the area bounded by the loop 7 in FIGURE 1.

Referring to the drawings in greater detail, there is illustrated in FIGURE 1 a boring bar 10 which is the subject of my copending application, Serial No. 582,180, filed May 2, 1956, for Boring Tool and Method for Making Same, now Patent No. 2,882,763. This boring bar 10 is provided with an axially extending cavity 12, the diameter of which varies axially in a stepwise manner, the diameter being greatest at the work cutting end of the boring bar. This cavity 12 is filled with grease and lead pellets 14, as described in my above identified copending application, so as to impart to the boring bar improved chatter resistant characteristics.

An improved tool holding attachment 16, which is the subject of the present application, is secured to the work cutting end of the boring bar 10. The attachment 16 is provided with a cylindrical projection 18 snugly fitted into the cavity 12 at the end of the boring bar 10. The connection is made permanent by brazing the projection 18 to the internal wall of the boring bar 10, this step being accomplished before the cavity 12 is filled with lead pellets and grease.

As best illustrated in FIGURE 2, the tool holding attachment 16 is formed of two mated cylindrical members 20 and 22. Member 20, hereinafter identified as a support member, is fixedly attached to the boring bar through the brazed connection between the cylindrical projection 18 and the boring bar 10. Member 22, hereinafter identified as a tool holding member, is detachably attachable to the member 20.

A single tool support member 22 is illustrated in the drawing. It is to be understood, however, that the present invention contemplates the use of a large number of tool support members 22, each adapted to attach to the single support member 20 illustrated and each adapted to hold a different kind of cutting tool, or to perform a different type of boring operation. In other words, the provision of a number of different types of tool holding members 22 will convert the boring bar 10 to a multi-purpose unit.

Referring specifically to the support member 20, it will be observed that this support member has the same diameter as the outer diameter of the boring bar 10 and, when brazed to the boring bar 10, constitutes an extension thereof. The outer end of member 20 is provided with flat faces 23 disposed in a common plane normal to the rotational axis of the boring bar 10, and with aligned projections 24a and 24b offset from the faces 23. These projections 24a and 24b cooperate, as will be described more fully subsequently, to form the tongue of a tongue and groove connection between the members 20 and 22. This tongue is made discontinuous by a boring 26 extending axially into the member 20. A stop 28 extends outwardly from the projection 24a. The function of this stop 28 will be described in detail subsequently.

Seated in the boring 26 in the member 20 is the cylindrical body 32 of a draw bar 30. This draw bar terminates at its outer end with a substantially rectangular head 34 engageable, as will be described subsequently, with the tool holding member 22. As best seen in FIGURE 2, the cylindrical body 32 is larger in diameter than the width of the projections 24a and 24b which, as described hereinbefore, cooperate to form a tongue on the member 20. So that this tongue may properly engage with the member 22, as will be described subsequently, diametrically opposite portions of the cylindrical body 32 are cut flat, as illustrated at 36 in FIGURE 2. This reduces the diameter of the cylindrical body 32 to a dimension less than the width of the projections 24a and 24b at the point where, in the assembled member 20, the body 32 of the draw bar is aligned with the projections 24a and 24b.

In assembling the draw bar 30 within the member 20, the cylindrical body 32 is projected into the boring 26 until a transverse slot 38 in the cylindrical body 32 registers with diametrically disposed borings 40 and 42 in the wall of the member 20. The draw bar 30 is locked within the member 20 by means of a pin 44 projected through the boring 40, the slot 38, and the boring 42. As is most apparent in FIGURE 2, the pin 44 includes three distinct sections identified by the reference numerals 46, 50 and 52.

The end section 46 of the pin 44 is dimensioned to fit snugly in the boring 40 of the member 20, and is provided with a hexagonal cavity 48 for receiving a suitable hexagonal wrench. The opposite end section 52 of the pin 44 is dimensioned to snugly fit the boring 42 in the member 20. As best illustrated in FIGURE 4, the boring 42 connects with a transversely disposed boring 60 threaded to receive a screw element 58. This screw element 58 is provided with an end portion of reduced diameter adapted to engage an annular groove 54 provided in the section 52 of the pin 44. Through this arrangement the pin 44 is journalled for rotation in the member 20 about an axis defined by the borings 40 and 42 and is rotatably locked in member 20 by the screw element 58.

The intermediate section 50, which comprises the main body portion of the pin 44 and functions as a cam element, passes through the slot 38 of the draw bar 30 to lock the draw bar 30 in the member 20. As best appears in FIGURE 2, the portion 50 is cylindrical, the diameter being less than the diameter of the section 46 of the pin 44, with its own geometric axis disposed eccentric to the axis of rotation of the pin 44 in the member 20.

The body section 50 is employed as a variable cam for actuating the draw bar 30 reciprocally in the member 20. FIGURES 5 and 6 illustrate two positions of the draw bar 30 as determined by two angular positions of the pin 44. In these figures, the cylindrical body portion 50 of the pin 44 is in section and, for the purposes of illustration, a reference mark 62 has been placed adjacent the periphery of this body portion. It will be observed that the pin 44 in FIGURE 6 is rotated approximately 100° from the position of the pin 44 in FIGURE 5 in a clockwise direction as viewed in these figures and it is evident in these figures that the clockwise movement of the pin 44 serves to move the draw bar 30 into the member 20.

Successful operation of the pin 44 requires a well defined dimensional interrelation between the body portion 50 of the pin 44 and the slot 38 of the draw bar 30. This interrelation is best observed in FIGURE 5. In this figure, the point on the periphery of the body portion 50 of the pin 44 indicated by the reference mark 62 is the point of maximum radius of the portion 50 relative to the axis of rotation of the pin 44. The diametrically opposite side of the body portion 50 is the point of minimum radius relative to the axis of rotation in the pin 44.

As best seen in FIGURES 5 and 6, the slot 38 in draw bar 30 has an elongated cross-section characterized by parallel side walls 39 and rounded end walls 41 and 43. The slot is formed by a cutting tool having a diameter substantially equal to the diameter of the body portion 50 of the pin 44. Thus, the body portion 50 fits snugly between the side walls 39 of slot 38. The arrangement is such that the body portion 50 is free to rotate in slot 38, however, since the body portion 50 is eccentric to the axis of rotation of pin 44, rotation of pin 44 will cause axial movement of the draw bar 30 into and out of the member 20.

Thus, in FIGURE 5 where the reference marker 62 of body portion 50 is midway between the side walls 39 of slot 38 the draw bar 30 is in an intermediate position. Upon rotation of the pin 44, 90° in either direction from this intermediate position, the draw bar 30 is moved inwardly or outwardly to an extreme position in member 20.

It is found desirable to limit the rotary motion of pin 44 in member 20. This is done by locating the slot 38 and the draw bar 30 slightly eccentric to the axis of rotation of the pin 44 and adjusting the elongation of slot 38 so that the maximum radius portion of body portion 50 indicated by reference marker 62, will clear one end wall 41 but not the other end wall 43 of the slot 38. This eccentric condition is exaggerated in the drawing.

Referring specifically to FIGURE 6, the body portion 50 of pin 44 is illustrated after rotation through approximately 100° in the clockwise direction from the position of FIGURE 5. This rotation has brought the draw bar 30 to an extreme inward position in member 20 in the first 90°, and in the final 10° has very slightly released the draw bar 30. It can travel no further in the clockwise direction due to binding with the end wall 43 of slot 38. A similar binding condition is obtained when the pin 44 is rotated approximately 100° in the counterclockwise direction from the position illustrated in FIGURE 5.

The pin 44 provides the means whereby the draw bar 30 may be actuated reciprocally between extreme positions in the member 20. This reciprocal movement of the draw bar 30 is utilized for releasably clamping the member 22 to the member 20.

As best appears in FIGURE 2, the member 22 is contoured on one end thereof so as to have spaced parallel projections 64 at that end defining an offset transverse groove 65. The projections 64 are undercut at 68 giving the groove 65 therebetween a T-shaped cross section. As illustrated in FIGURE 7, the opposing faces 66 of the projections 64 are inclined one to the other at a small angle (exaggerated in the drawing) to introduce a taper in the groove 65.

As is evident from FIGURE 2, the undercut portions 68 of the projections 64 establish a slot for receiving the substantially rectangular head 34 of the draw bar 30. Thus, this head 34 may be slid into the groove 65 whereupon the projections 24a and 24b on the member 20 are seated in the tapered portion of the groove 65. As appears in FIGURE 7, the projections 24a and 24b have substantially the same taper as the groove 65.

With reference to FIGURE 3, the periphery of the member 22 adjacent the groove 65 therein is faced off, as illustrated at 70, to provide an abutment for seating against the stop element 28 of the member 20. This provides one of three points of alignment required to align the member 22 precisely with the member 20.

With the two members 20 and 22 thus aligned, the pin 44 may be rotated to draw the draw bar 30 inwardly of the member 20 thereby pulling the members 20 and 22 into snug engagement. To insure a snug connection, the projections 24a and 24b are made slightly wider than the tapered portion of the groove 65. This causes the projections 64 which form the groove to spread slightly as the projections 24a and 24b are forced therebetween by operation of the draw bar 30. The undercut portions 68 assist the spreading of the projections 64. As a result of this action, the projections 64 compressively grip the projections 24a and 24b, forcing an exact alignment between these projections. This, then, is a second point of alignment between the members 20 and 22.

A third point of alignment is supplied by the faces 23 of the member 20 which cooperate with faces 72 on the ends of the projections 64 of the member 20 to align the member 22 relative to the member 20. To this end, the members 20 and 22 are dimensioned one relative to the other, so that upon the draw bar 30 being driven to its extreme inward position by the pin 44, the faces 72 of the member 22 are firmly butted against the faces 23 of the member 20.

The faces 23 and 72 cooperate to align the geometric axis of the member 22 parallel to the geometric axis of member 20 and therefore parallel to the geometric axis of the boring bar 10. The projections 24a, 24b and 64 of the members 20 and 22 cooperate to align these axes in a predetermined plane, and the stop element 28 cooperates with the abutment 70 of the member 22 to align these axes coaxially.

Through this construction, a precise and reproducible alignment may be obtained between the tool holding member 22 and the boring bar 10.

The member 22 illustrated in the drawings is constructed to support a cutting tool 74 at an angle of substantially 60° relative to the axis of rotation of the boring bar 10. As illustrated, set screws 76 secure the cutting tool 74 at a fixed radial position so that a boring of predetermined diameter may be made. It will be apparent to those skilled in the art that it is desirable on some occasions to have the cutting tool arranged at 90° to the axis of rotation of the boring bar 10, then on other occasions at an angle which is neither 60° nor 90° relative to the axis of rotation of the boring bar 10. In accordance with such needs, one member 22 may be provided for each distinct cutting angle required and for each distinct type of cutting tool required, each of the members 22 being provided with spaced projections 64 as described herein for interchangeable attachment to the member 20 associated with the boring bar.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In combination, a pair of elongate members having mated interengageable end portions, and self-locking cam means for drawing said members into interengaging relation, said cam means including a draw bar having a head portion at one end thereof, one of said members having a longitudinal cavity in the mated end thereof slidably receiving said draw bar, the other member having a portion in the mated end thereof detachably engageable with the head portion of said draw bar, said draw bar having a transverse slot therein extending normal to the longitudinal axis thereof, said slot having an elongated cross-section formed by generally parallel side walls spaced longitudinally with respect to the axis of said draw bar and end walls spaced a distance greater than the side walls, said one member having a boring therein aligned with the slot in said draw bar, a pin journalled for rotation in said boring and passing longitudinally through said slot, said pin having a cam portion within said slot eccentric to the axis of rotation of said pin, said cam portion having a maximum diameter substantially equal to the distance between the side walls of said slot, the axis of rotation of said pin passing through said slot at a location spaced from the midpoint between said end walls, there being adequate clearance for rotational movement of said cam portion between said rotational axis and one end wall of said slot, but inadequate clearance for free rotational movement of said cam portion between said rotational axis and the other end of said slot.

2. The combination according to claim 1 wherein the mated end of one of said members has a tongue extending therefrom and the mated end of the other member includes a pair of parallel extending projections spaced to provide a complementary groove to receive the tongue, one of said tongue and groove portions being tapered to a width less than that of the other, said tongue, upon being drawn into said groove by operation of said draw bar, forcibly spreading said projections whereby said tongue is compressively gripped by said projections.

3. The combination according to claim 1 wherein one of said members constitutes the end portion of a boring bar and the other of said members includes means for receiving and supporting a cutting tool.

4. The combination according to claim 1 wherein the end walls of the slots in said draw bar are arcuate and have a radius of curvature substantially equal to half the distance between the side walls of said slot.

5. In combination, a pair of members having mated interengageable end portions, and self-locking cam means for drawing said members into interengaging relation, said cam means including a draw bar, one of said members having a longitudinal cavity therein slidably receiving said draw bar, said draw bar having a head portion projecting out of said cavity, the other member having a portion in the mated end thereof engageable with said head portion, said draw bar having a transverse slot therein having side walls extending substantially normal to the longitudinal axis thereof and an end wall connecting said side walls, said one member having a boring therein aligned with said slot, a pin journalled for rotation in said boring extending through said slot, said pin having an eccentric cam portion within said slot cooperating with the side walls of said slot to move said draw bar axially when rotated, said cam portion having on one side thereof a maximum radius and on the opposite side thereof a minimum radius relative to the axis of rotation of said pins, said maximum and minimum radii when added together comprising the maximum diameter of said cam portion, the distance between said side walls being at least as large as said maximum diameter, said end wall being spaced from the rotational axis of said pin a distance greater than the minimum radius of said cam portion but less than the maximum radius of said cam portion, the rotation of said pin being limited to an angle exceeding 180° but less than 360° due to said cam portion binding with said end wall at the extreme rotary positions thereof.

6. In combination, a pair of mated members, one of said members having a transversely extending tongue projecting from the end thereof, the other of said members having spaced parallel extending projections at the end thereof forming a complementary transverse groove for receiving the tongue, said projections being tapered whereby the groove formed thereby converges inwardly, the opposing sides of the projections forming said groove each having an undercut portion theren extending inwardly of the tapered portion thereof, said groove being too small to receive said tongue without spreading of said projections, means including an element slidably carried by said one member and projecting through the tongue therein for drawing said groove about said tongue, said element being engageable in the undercut portions of said projections, and means for sliding said element relative to said one member upon engagement of said element with said undercut portions to draw said groove about said tongue, said tongue, upon moving into said groove forcibly spreading said projections whereby the projections compressively engage said tongue, said undercut portions assisting the projections to spread upon the tongue moving therebetween.

7. In combination, a pair of mated elongate members, the end portion of one member comprising a flat face with a transversely extending tongue projecting therefrom, the end portion of the other member including a pair of spaced parallel extending projections defining a complementary groove for receiving the tongue, the opposite sides of said projections being oppositely inclined to provide a groove which tapers inwardly to a width less than that of the tongue, said groove being too small to receive said tongue without spreading of said projections, the ends of said projections cooperating to form a flat face, and means carried by one of said members engageable with the other of said members operable to draw said tongue into said groove and thereby bring said flat faces into contact, said tongue being tapered to complement the taper in said groove and, until it is drawn tightly into said groove being slidable along said groove to permit adjustment in the alignment of said members, said one member including a stop element projecting from one transverse extremity of said tongue and the end portion of said other member including an abutment portion at the periphery thereof for engaging said top element to limit the sliding movement of said tongue in said groove, the faces of said end portions when in abutment aligning the longitudinal axes of said members in parallel, the tongue and groove portion co-operating with said stop element and said abutment portion to place said axes in coaxial alignment, and said tongue, upon entering said groove, forcibly spreading said projections such that said projections compressively grip said tongue.

References Cited in the file of this patent

UNITED STATES PATENTS

| | | |
|---|---|---|
| 2,739,496 | Fleischer | Mar. 27, 1956 |
| 2,828,672 | McMullen | Apr. 1, 1958 |

FOREIGN PATENTS

| | | |
|---|---|---|
| 107,220 | Great Britain | June 28, 1917 |
| 265,579 | Switzerland | Mar. 1, 1950 |
| 520,627 | Italy | Mar. 23, 1955 |
| 1,107,314 | France | Aug. 3, 1955 |

UNITED STATES PATENT OFFICE
CERTIFICATE OF CORRECTION

Patent No. 3,064,503                                November 20, 1962

Hugh A. Fry

It is hereby certified that error appears in the above numbered patent requiring correction and that the said Letters Patent should read as corrected below.

Column 4, line 46, for "abtument" read -- abutment --; column 6, line 26, for "pins" read -- pin --; line 45, for "theren" read -- therein --; column 7, line 8, for "top" read -- stop --.

Signed and sealed this 27th day of August 1963.

(SEAL)
Attest:

ERNEST W. SWIDER                                    DAVID L. LADD
Attesting Officer                                        Commissioner of Patents